US005593745A

United States Patent [19]

Haselkorn et al.

[11] Patent Number: 5,593,745

[45] **Date of Patent: *Jan. 14, 1997**

[54] INSULATED PORT LINER ASSEMBLY

[75] Inventors: Michael H. Haselkorn, Peoria; Michael C. Long, Peoria Heights, both of Ill.

[73] Assignee: Caterpillar Inc., Peoria, Ill.

[ * ] Notice: The term of this patent shall not extend beyond the expiration date of Pat. No. 5,404,716.

[21] Appl. No.: 201,290

[22] Filed: Feb. 24, 1994

[51] Int. Cl.$^6$ .............................. B32B 1/08; F01N 7/10; D03D 49/26

[52] U.S. Cl. ...................... 428/34.5; 428/34.6; 428/34.7; 428/36.2; 428/36.91; 29/888.061; 60/272; 60/323; 138/145; 138/146; 138/149; 138/DIG. 10; 164/98

[58] Field of Search ................................ 428/34.5, 34.6, 428/34.7, 36.1, 36.2, 36.9, 36.91; 29/888.061; 60/272, 323; 138/145, 146, 149, DIG. 10; 164/98

[56] References Cited

U.S. PATENT DOCUMENTS

| | | | |
|---|---|---|---|
| 3,577,727 | 5/1971 | Warren et al. | 60/272 |
| 3,709,772 | 1/1973 | Rice | 161/139 |
| 3,724,218 | 4/1973 | Cole | 60/282 |
| 3,729,937 | 5/1973 | Haddad | 60/298 |
| 3,864,908 | 2/1975 | Lahaye | 60/272 |
| 3,919,755 | 11/1975 | Kaneko et al. | 29/156.4 |
| 3,949,552 | 4/1976 | Kaneko et al. | 60/282 |
| 4,077,458 | 3/1978 | Hayashi et al. | 164/11 |
| 4,148,352 | 4/1979 | Sensui et al. | 164/112 |
| 4,206,598 | 6/1980 | Rao et al. | 60/282 |
| 4,341,826 | 7/1982 | Prewo et al. | 428/36.1 |
| 4,346,556 | 8/1982 | Rice et al. | 60/272 |
| 4,526,824 | 7/1985 | Dworak et al. | 428/35 |
| 4,604,779 | 8/1986 | Narita et al. | 29/156.4 |
| 4,676,064 | 6/1987 | Narita et al. | 60/272 |
| 4,715,178 | 12/1987 | Tsukuda et al. | 60/272 |
| 4,849,266 | 7/1989 | Dwivedi et al. | 428/34.4 |
| 4,890,663 | 1/1990 | Yarshmadi | 164/98 |
| 4,969,263 | 11/1990 | Adams | 29/888.06 |
| 5,052,463 | 10/1991 | Lechner et al. | 164/35 |
| 5,150,572 | 9/1992 | Johnson et al. | 60/272 |
| 5,251,683 | 10/1993 | Backer | 164/98 |
| 5,404,716 | 4/1995 | Wells et al. | 60/272 |

FOREIGN PATENT DOCUMENTS

| | | |
|---|---|---|
| 2231921 | 11/1990 | United Kingdom . |

*Primary Examiner*—Marion E. McCamish
*Assistant Examiner*—Blaine R. Copenheaver
*Attorney, Agent, or Firm*—Diana L. Charlton

[57] ABSTRACT

The design and construction of past exhaust port liners with heat insulation capabilities have had to become more simple in order to reduce costs. However, less costly exhaust port liners may have inferior heat insulation capabilities. The present invention overcomes this and other problems with a means for encapsulating an insulating layer of material. The encapsulating means is composed of fiberglass cloth with the ability to withstand high temperatures. A blanket is formed when the fiberglass cloth encapsulates the insulating layer. The blanket is stitched in a quilted pattern to form a plurality of individual pockets. The blanket is wrapped around a ceramic body of a port liner. The quilted stitching pattern, due to separating the insulating layer into the plurality of individual pockets, protects the pockets individually. If damage should occur to one of the plurality of pockets, the insulating layer would remain intact within the remaining plurality of pockets. Therefore, the surrounding pockets retain their individual insulating layer increasing the durability of the blanket and prolonging the life of the insulating layer. The ability to protect the insulating layer from catastrophic damage increases efficiency and decreases the rate of heat loss. The ability to decrease the rate of heat loss increases engine efficiency.

42 Claims, 2 Drawing Sheets

INSULATED PORT LINER ASSEMBLY

TECHNICAL FIELD

This invention relates generally to a port liner for use in an internal combustion engine and more particularly to the insulation of the port liner for reduced heat rejection.

BACKGROUND ART

Present day engine components must be manufactured more simply at significantly reduced costs while achieving superior results in order for engine manufacturers to remain competitive. Unfortunately, port liners that have become less complicated have either failed to produce superior heat insulation capabilities or have become less durable, increasing associated replacement costs.

The heat-insulated port liner for a device composed of a cast metal disclosed in U.S. Pat. No. 4,676,064 by Yoshinori Narita et. al. on Jun. 30, 1987 includes a tubular port liner composed of a ceramic material, a first covering layer disposed on the outer surface of the liner and composed of refractory fibers, and a second covering layer disposed on the outer surface of the first covering layer and composed of a metal having a melting point not lower than the melting point of the cast metal. The port liner is made from a material having a low coefficient of thermal expansion and high thermal resistance, such as, aluminum titanate. Unfortunately, no range is given for the coefficient of thermal expansion needed for the port liner used with a cast aluminum cylinder head. It is well known that the melting point of aluminum is lower than that of cast iron and that aluminum titanate can be effectively used with molten aluminum. However, aluminum titanate would decompose if exposed to molten cast iron due to the additional stresses. Therefore, an aluminum cylinder head can utilize a port liner made from a material having a higher coefficient of thermal expansion than a cast iron cylinder head without damage to the port liner during the casting process. The port liner disclosed by Narita would be destroyed during the casting process if used with a cast iron cylinder head. Additionally, since the first covering layer is unsupported, settling of the refractory fibers occurs when the fibers are exposed to typical engine vibration experienced during operation. This settling effect limits the effectiveness of the insulation and may lead to the destruction of the entire insulation layer. Once destroyed, the insulation would be free to disintegrate and enter the exhaust passage.

A method and apparatus for insulating the exhaust passage of an internal combustion engine is disclosed in U.S. Pat. No. 4,206,598 by Vemulapalli D. Rao on Jun. 10, 1980. A three-zone liner assembly is provided with an outer zone comprised of a room temperature vulcanizing silicone sleeve, an inner zone comprised of a stamped and seam welded high strength Al—Cr-steel alloy, and an intermediate zone consisting of a ceramic wool mat. The intermediate zone consisting of the ceramic wool mat of insulation is encased within the seam welded inner zone of metal protecting the insulation from damage. However, if the weld fails, the insulation is subjected to possible damage which, as with Narita, would cause disintegration of the insulation and destruction of the entire insulation layer.

The present invention is directed to overcoming the problems as set forth above.

DISCLOSURE OF THE INVENTION

In one aspect of the present invention, a port liner assembly is adapted for use with an internal combustion engine. The assembly includes a tubular port liner. The liner includes a body which has an outer surface and a radial outwardly extending annular flange. An insulating layer of material substantially surrounds the outer surface. Means are provided for encapsulating the layer of material. The encapsulating means is composed of an insulating material having high thermal resistance.

In another aspect of the present invention, a port liner assembly is provided for use with a cylinder head of an internal combustion engine. The cylinder head is composed of a cast metal which is molded around the port liner. A tubular port liner is disposed within the cylinder head. The liner includes a body which has an outer surface and a radial, annular flange which extends outwardly. An insulating layer of material substantially surrounds the outer surface. Means are provided for totally encapsulating the layer of material. The encapsulating means is composed of an insulating material having high thermal resistance.

In yet another aspect of the present invention, a method of making an insulated port liner assembly adapted for use with an internal combustion engine is provided. The method includes forming a tubular port liner. Then, covering substantially an outer surface of the liner with an layer of insulation composed of a material including ceramic fibers. Finally, encapsulating the layer of insulation with a woven fiberglass material having high thermal resistance.

The present invention, through the use of encapsulating a layer of insulation within a thermal resistant insulating material provides a simple and durable method to limit heat rejection for greater engine efficiency.

BEST MODE FOR CARRYING OUT THE INVENTION

Figure 1:
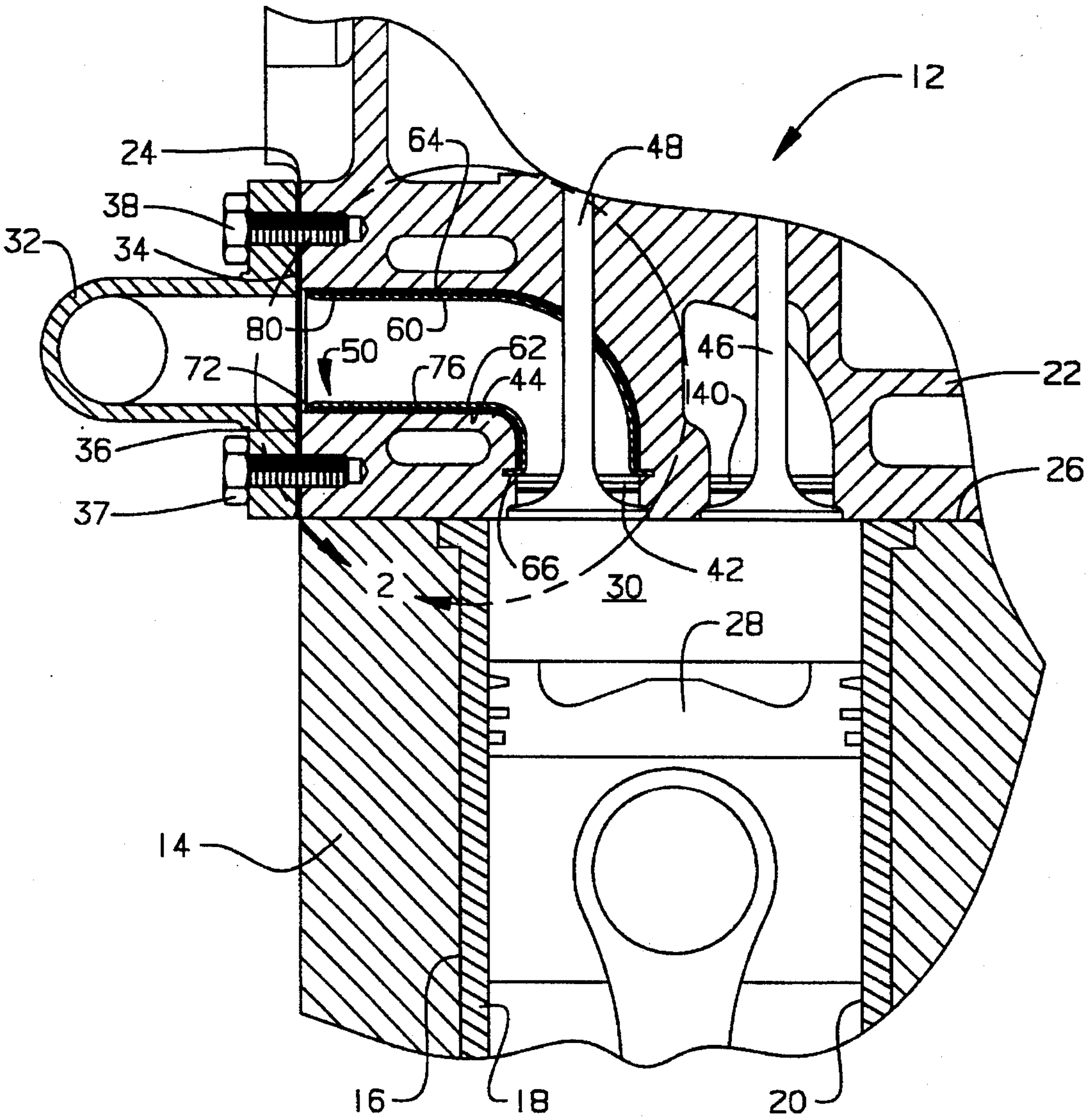
FIG. 1 is partial section view of an internal combustion engine embodying the present invention.

An internal combustion engine 12 having a cylinder block 14 defining a bore 16 is shown in FIG. 1. The bore 16 has a cylinder liner 18 disposed therein. The cylinder liner 18 defines a cylinder bore 20 and a cylinder head 22 has an outer mounting surface 24 and an inner mounting surface 26 which attaches to the cylinder block 14 in closing relation to the cylinder bore 20. The cylinder head 22 is composed of cast iron and can be formed by any suitable casting process. A piston 28 is reciprocally mounted in the cylinder bore 20 and defines with the cylinder head 22 a variable volume combustion chamber 30. An exhaust manifold 32 is releasably connected to the cylinder head 22 and has a mounting surface 34. An exhaust gasket 36 or any suitable type of sealing means is mounted between the outer mounting surface 24 of the cylinder head 22 and the mounting surface 34 of the exhaust manifold 32 by a plurality of bolts, two of which are shown at 37 and 38. An intake port 40 and exhaust port 42 are formed in the cylinder head 22. At least a portion of the exhaust port 42 has a substantially cylindrical wall 44 extending between the combustion chamber 30 and the exhaust manifold 32 to fluidly connect them. An intake valve 46 and exhaust valve 48 having a normally closed position and an open position are disposed within the intake port and exhaust port 40,42, respectively. The intake port 40 fluidly communicates intake air to the combustion chamber 30 during an intake cycle of the engine 12. The exhaust port 42 fluidly communicates exhaust gases out of the combustion chamber 30 during an exhaust stroke of the engine 12. A turbocharger (not shown) is connected to the exhaust port 42 and to the intake port 40 between the combustion chamber 30 and the intake air.

Figure 2:
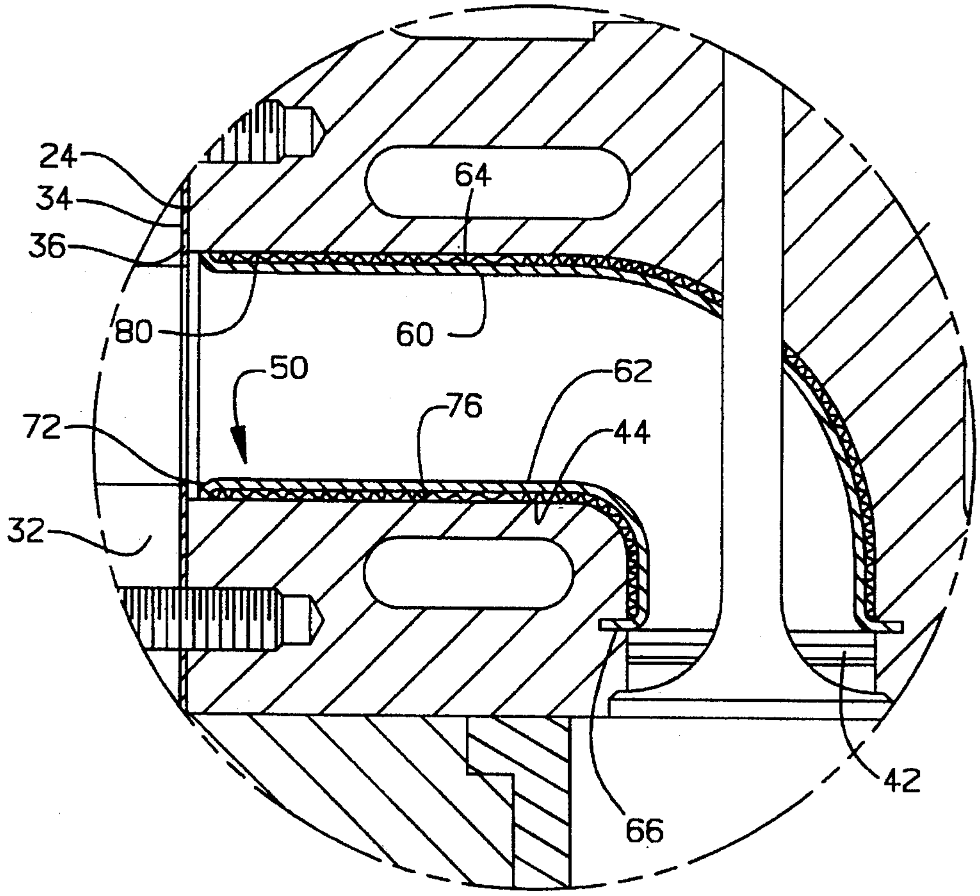
FIG. 2 is an enlarged view of the area encircled by line 2 as shown in FIG. 1.

A port liner assembly 50 is shown in FIGS. 1 and 2 and is cast in place within the cylinder head 22. The port liner assembly 50 includes an exhaust port liner 60 which has a cylindrical body 62 disposed within the exhaust port 42 extending along the cylindrical wall 44. The cylindrical body 62 has an outer surface 64 and is composed of a structural ceramic formed with compounds having a low coefficient of thermal expansion and high thermal conductivity, such as silicon nitride, silicon-aluminum-oxy-nitride (SiAlON), or aluminum nitride. The coefficient of thermal expansion should be within the range of 3 to 5 E-6/C and should have a thermal conductivity within the range of 15–150 W/M°K. An annular flange 66 is attached to the body 62 and extends radially outwardly from the body 62 through the cylindrical wall 44 and into the cylinder head 22 a predetermined distance. The annular flange 66 is composed of a material having a high coefficient of expansion, such as stainless steel and is attached to the body 62 by any suitable means, such as brazing or press-fitting. The flange 66 becomes integral with the cylinder head 22 during the casting process, without becoming chemically bonded, to support the exhaust port liner 60 within the exhaust port 42. The body 62 is spaced a predetermined distance away from the cylindrical wall 44 of the exhaust port 42. An outwardly extending annular lip 72 is attached to the body 62 in close proximity to the cylindrical wall 44 so that a substantially enclosed space 76 is formed between the exhaust port liner 60 and the cylinder head 22. The lip 72 is composed of a material having a high coefficient of expansion, such as stainless steel and is attached to the body 62 by any suitable means, such as brazing or press-fitting.

It should be understood that although the wall 44 and the body 62 are disclosed as having cylindrical geometric shapes, that any suitable geometric shape may be used, such as rectangular, square, oval, etc.. It should also be understood that the location of the port liner 60 is not limited to the exhaust port 42 but may be used in any suitable location, such as the intake port 40. It should further be understood that the lip 72, the flange 66, and the body 62 may be integrally cast as a single piece or may be manufactured as separate pieces or a combination of a casting and manufacturing process.

Figure 3:
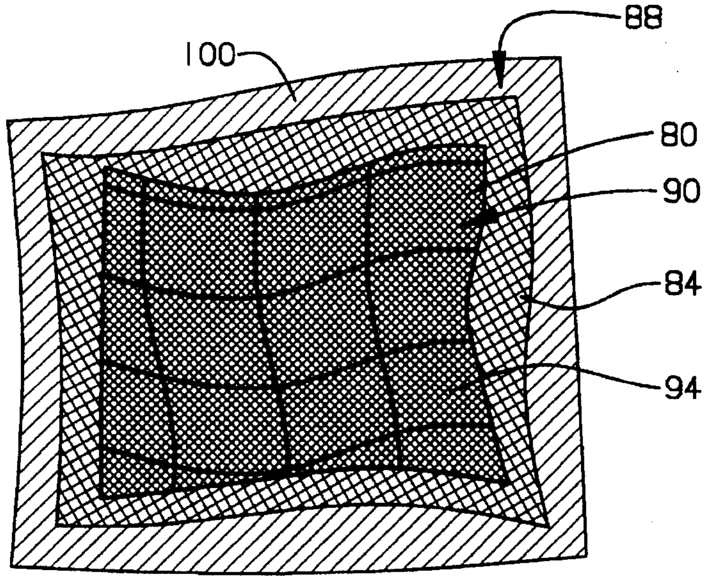
FIG. 3 is a diagrammatic view showing a portion of the present invention.

An insulating layer 80 of material is shown in FIGS. 1–3, but more specifically in FIG. 3 and is disposed within the enclosed space 76 and substantially surrounds the outer surface 64 to cover the cylindrical body 62 of the liner 60. The layer 80 includes insulating materials, such as low-shot alumino-silicate fibers or powder, mineral wool, or refractory ceramic fibers, but preferably alumino-silicate. A means 84 composed of an insulating material, such as bidirectional woven fiberglass, is used to encapsulate the insulating layer 80. The encapsulating means 84 must be composed of fiberglass cloth capable of withstanding casting temperatures exceeding 1400° C. The insulating material 80 constitutes an inner layer of material while the woven fiberglass 84 constitutes an outer layer of material. The inner and the outer layers of material, made up of the insulating material 80 and fiberglass 84, respectively, serve to define an insulating blanket 88. The blanket 88 has a thickness in the range of about 0.25 inches to 0.325 inches. The blanket 88 is stitched in a quilted pattern 90 to define a plurality of individual, separated pockets 94. The pockets 94 have dimensions in the range of about 0.5 inches in length to about 1 inch in length and about 0.5 inches in width to 1 inch in width. However, it should be understood that any suitable stitching pattern or dimensions may be used.

A protective layer 100 may be formed around the blanket 88 to further protect the inner insulating layer 80. The protective layer 100 may be formed of any suitable material, but preferable a stainless steel foil.

Industrial Applicability

In use, high temperature exhaust gas generated during combustion is released during the exhaust stroke of the internal combustion engine 12. The exhaust gas is communicated from the combustion chamber 30 and into the exhaust port 42 when the exhaust valve 48 is in the open position. It is important that heat produced from the high temperature exhaust gas be retained within the exhaust port 42 before entering the exhaust manifold 32 so that more thermal energy can be supplied to the turbocharger (not shown) for greater engine efficiency. Additionally, a reduction in heat that is dissipated to the cooling water, decreases the cooling system requirements.

The blanket 88 is formed when the inner layer of insulating ceramic material 80 is encapsulated within an outer layer of fiberglass 84. The fiberglass 84 is made from a cloth capable of withstanding the high temperatures of the casting process and subsequent exhaust gas temperatures. The blanket 88 is stitched in a quilted pattern 90 to separate the insulating materials into the plurality of individual pockets 94. The blanket 88 is then wrapped around the outer surface 64 of the ceramic body 62 of the port liner 60 to form the port liner assembly 50.

The port liner assembly 50 is then cast in place within the cylinder head 22. During the casting process, stresses occur due to the large difference in thermal expansion coefficients between the cast iron and the port liner assembly 50. The difference in the thermal expansion coefficients ordinarily would cause damage to the ceramic material of the body 62. However, in the present invention, damage to the ceramic body 62 is virtually eliminated. This is accomplished because the steel lip 72 and flange 66 reduce the stresses that develop on the ends of the ceramic body 62 by expanding away from the ceramic body 62 when heated by the molten iron. As the casting cools, the lip 72 and the flange 66 contract around the ceramic body 62 to support it. Since the ceramic body 62 is not rigidly supported during the cooling process, stresses are reduced within the ceramic body 62 thus protecting it from damage. The blanket 88 protects the remainder of the ceramic body 62 from casting stresses and thermal shock by preventing molten iron from contacting the ceramic body 62. Although no molten iron comes into direct contact with the ceramic body 62, heat is still conducted through the lip 72 and the flange 66 to the ceramic body 62. The high thermal conductivity of the ceramic body 62 quickly and uniformly dissipates this heat, and in combination with the low coefficient of expansion, thermal shock stresses in the ceramic body 62 are minimized. Additionally, the ceramic body 62 is better able to withstand the thermal cycles experienced during normal engine operation. This is achieved due to the ceramic body 62 at exhaust temperatures having a similar total expansion rate as the cast iron running at cooler, coolant water temperatures. The ability of the ceramic body 62 to maintain a similar expansion rate as the cast iron increases the durability of the port liner 60.

The quilted stitching pattern 90, due to separating the insulating layer of material 80 into the plurality of individual pockets 94, supports and protects the pockets 94 individually. If damage should occur to one of the plurality of pockets 94, the inner insulating layer 80 would remain intact within the remaining plurality of pockets 94. Therefore, the surrounding pockets 94 retain their individual inner insulating layer 80, increasing the durability of the blanket 88 and prolonging the life of the insulating layer 80. The ability to protect the insulating layer 80 from catastrophic damage increases efficiency and decreases the rate of heat loss. The decreased rate of heat loss retains thermal energy in the exhaust gas for driving the turbocharger (not shown) at a faster rate which increases incoming air pressure for increased engine efficiency.

In view of the above, it is apparent that the present invention provides a means for encapsulating a layer of insulation within a thermally resistant insulating material to provide a simple and durable method to limit heat rejection for greater engine efficiency.

We claim:

1. A port liner assembly adapted for use with an internal combustion engine, comprising:

a tubular port liner, the liner including a body composed of a ceramic material with a low coefficient of expansion within the range of 3 to 5 E-6/C and high thermal conductivity within the range of 15–150 W/M$^o$ K having an outer surface and a radial outwardly extending annular flange;

an insulating layer of material substantially surrounding the outer surface; and means for totally encapsulating the insulating layer of material, the encapsulating means being composed of fiberglass cloth.

2. The port liner assembly of claim 1, wherein the flange is attached to the body and a lip is attached to the body at an end opposite the flange.

3. The port liner assembly of claim 2, wherein the flange and the lip are brazed to the body.

4. The port liner assembly of claim 2, wherein the flange and the lip are press-fitted to the body.

5. The port liner assembly of claim 2, wherein the flange and the lip are composed of a material having a high coefficient of expansion relative to the material of the body.

6. The port liner assembly of claim 5, wherein the flange and the lip are composed of stainless steel.

7. The port liner assembly of claim 1, wherein the encapsulating means and the insulating layer of material combine to form a blanket removably fitted around the surface.

8. The port liner assembly of claim 7, wherein the blanket is stitched in a quilted pattern to define a plurality of pockets.

9. The port liner assembly of claim 8, wherein the flange is attached to the body and a lip is attached to the body at an end opposite the flange.

10. The port liner assembly of claim 9, wherein the flange and the lip are brazed to the body.

11. The port liner assembly of claim 9, wherein the flange and the lip are press-fitted to the body.

12. The port liner assembly of claim 9, wherein a protective layer of material is formed around the blanket.

13. The port liner assembly of claim 12, wherein the material for the protective layer is stainless steel foil.

14. The port liner assembly of claim 13, wherein the flange and the lip are composed of a material having a high coefficient of expansion relative to the material of the body.

15. The port liner assembly of claim 14, wherein the flange and the lip are composed of stainless steel.

16. The port liner assembly of claim 15, wherein the insulating layer of material is composed of alumino-silicate.

17. The port liner assembly of claim 16, wherein the insulating layer of material is composed of substantially shot free alumino-silicate.

18. The port liner assembly of claim 15, wherein the insulating layer of material is composed of mineral wool.

19. The port liner assembly of claim 15, wherein the insulating layer of material is composed of refractory fiber.

20. A port liner assembly for use with a cylinder head of an internal combustion engine, the cylinder head being composed of a cast metal which is molded around the port liner assembly, comprising:

a tubular port liner is disposed within the cylinder head, the liner including a body composed of a ceramic material with a low coefficient of expansion within the range of 3 to 5 E-6/C and high thermal conductivity within the range of 15–150 W/M$^o$ K having an outer surface and a radial outwardly extending annular flange;

an insulating layer of material substantially surrounding the outer surface; and means for totally encapsulating the insulating layer of material, the encapsulating means composed of fiberglass cloth.

21. The port liner assembly of claim 20, wherein the flange is attached to the body and a lip is attached to the body at an end opposite the flange.

22. The port liner assembly of claim 21, wherein the flange and the lip are brazed to the body.

23. The port liner assembly of claim 21, wherein the flange and the lip are press-fitted to the body.

24. The port liner assembly of claim 21, wherein the flange and the lip are composed of a material having a high coefficient of expansion relative to the material of the body.

25. The port liner assembly of claim 24, wherein the flange and the lip are composed of stainless steel.

26. The port liner assembly of claim 20, wherein the encapsulating means and the insulating layer of material combine to form a blanket removably fitted around the surface.

27. The port liner assembly of claim 26, wherein the blanket is stitched in a quilted pattern to define a plurality of pockets.

28. The port liner assembly of claim 27, wherein the flange is attached to the body and a lip is attached to the body at an end opposite the flange.

29. The port liner assembly of claim 28, wherein the flange and the lip are brazed to the body.

30. The port liner assembly of claim 28, wherein the flange and the lip are press-fitted to the body.

31. The port liner assembly of claim 28, wherein a protective layer of material is formed around the blanket.

32. The port liner assembly of claim 31, wherein the material for the protective layer is stainless steel foil.

33. The port liner assembly of claim 32, wherein the flange and the lip are composed of a material having a high coefficient of expansion relative to the material of the body.

34. The port liner assembly of claim 33, wherein the flange and the lip are composed of stainless steel.

35. The port liner assembly of claim 34, wherein the insulating layer of material is composed of alumino-silicate.

36. The port liner assembly of claim 35, wherein the insulating layer of material is composed of substantially shot free alumino-silicate.

37. The port liner assembly of claim 34, wherein the insulating layer of material is composed of mineral wool.

38. The port liner assembly of claim 34, wherein the insulating layer of material is composed of refractory fiber.

39. A method of making an insulated port liner assembly adapted for use with an internal combustion engine, comprising the steps of:

forming a tubular port liner;

covering substantially an outer surface of the liner with a layer of insulation composed of a material including ceramic fibers; and totally encapsulating the layer of insulation with a woven fiberglass material to jointly define a blanket.

40. The method of making an insulated port liner assembly of claim 39, wherein the step of forming a tubular port liner includes the steps of:

forming a body composed of a material including a structural ceramic having a low coefficient of expansion within the range of 3 to 5 E-6/C and high thermal conductivity within the range of 15–150 W/M$^{o}$ K;

attaching a flange at an end of the body, the flange composed of a material having a coefficient of expansion higher than the coefficient of expansion of the ceramic body; and attaching a lip at an end opposite the flange, the lip composed of a material having a coefficient of expansion higher than the coefficient of expansion of the ceramic body.

41. The method of making an insulated port liner assembly of claim 40, including the step of:

stitching the blanket in a quilted pattern to form a plurality of pockets.

42. The method of making an insulated port liner assembly of claim 41, including the step of:

covering the woven fiberglass material with a protective layer of material composed of stainless steel foil.

* * * * *